(12) United States Patent
Yang et al.

(10) Patent No.: US 11,591,496 B2
(45) Date of Patent: Feb. 28, 2023

(54) NON-STICKING TIPPING PAPER, PREPARATION METHOD AND APPLICATION METHOD OF THE SAME

(71) Applicant: CHINA TOBACCO YUNNAN INDUSTRIAL CO., LTD., Kunming (CN)

(72) Inventors: Ji Yang, Kunming (CN); Zhihua Liu, Kunming (CN); Ruizhi Zhu, Kunming (CN); Chunbo Liu, Kunming (CN); Nengjun Xiang, Kunming (CN); Pei He, Kunming (CN); Xiaoxi Si, Kunming (CN); Fengmei Zhang, Kunming (CN); Shiyun Tang, Kunming (CN); Wei Jiang, Kunming (CN); Zhenjie Li, Kunming (CN); Zhongbi Su, Kunming (CN); Chen Yang, Kunming (CN); Kunming Jiang, Kunming (CN)

(73) Assignee: China Tobacco Yunnan Industrial Co., Ltd., Kunming (CN)

( * ) Notice: Subject to any disclaimer, the term of this patent is extended or adjusted under 35 U.S.C. 154(b) by 0 days.

(21) Appl. No.: 17/834,428

(22) Filed: Jun. 7, 2022

(65) Prior Publication Data
US 2022/0298388 A1 Sep. 22, 2022

Related U.S. Application Data

(63) Continuation of application No. PCT/CN2020/141588, filed on Dec. 30, 2020.

(30) Foreign Application Priority Data

Nov. 10, 2020 (CN) .......................... 202011247849.0

(51) Int. Cl.
*C09J 7/29* (2018.01)
*C09J 7/38* (2018.01)
(Continued)

(52) U.S. Cl.
CPC ................. *C09J 7/29* (2018.01); *A24C 5/005* (2013.01); *A24C 5/47* (2013.01); *A24D 1/02* (2013.01);
(Continued)

(58) Field of Classification Search
None
See application file for complete search history.

(56) References Cited

U.S. PATENT DOCUMENTS

| 11,320,365 B2 | 5/2022 | Yang et al. |
| 2022/0050047 A1 | 2/2022 | Yang et al. |

FOREIGN PATENT DOCUMENTS

| CN | 104974593 A | 10/2015 |
| CN | 105200863 A * | 12/2015 |

(Continued)

OTHER PUBLICATIONS

Machine translation of CN-105200863A, Gooole Patents, 2022, [online], retrieved from the Internet, (retrieved Nov. 22, 2022, <URL: https://patents.google.com/patent/CN105200863A/en>. (Year: 2022).*

(Continued)

*Primary Examiner* — Dennis R Cordray
(74) *Attorney, Agent, or Firm* — Andrew D. Fortney; Central California IP Group, P.C.

(57) ABSTRACT

A non-sticking lip tipping paper is disclosed that includes a base paper, a color layer and a surface coating. The color layer is formed by printing and drying a color ink on the base paper; the surface coating includes a water-based glue and is coated thereon after drying the color layer. The water-based (Continued)

glue includes the following components by weight: 30-65 parts of a modified water-based resin solution, 10-20 parts of water, 8-15 parts of ethanol, and 5-12 parts of a water-based additive. The water-based additive is a mixture of a wax emulsion and magnesium silicate in a weight ratio of 1:5. A preparation method and a method of applying the non-sticking lip tipping paper are also disclosed.

11 Claims, 1 Drawing Sheet

(51) Int. Cl.
| | |
|---|---|
| C09J 11/08 | (2006.01) |
| C09J 11/04 | (2006.01) |
| D21H 19/82 | (2006.01) |
| D21H 19/12 | (2006.01) |
| D21H 19/60 | (2006.01) |
| A24C 5/47 | (2006.01) |
| A24C 5/00 | (2020.01) |
| A24D 3/04 | (2006.01) |
| A24D 1/02 | (2006.01) |

(52) U.S. Cl.
CPC .............. *A24D 3/04* (2013.01); *C09J 7/385* (2018.01); *C09J 11/04* (2013.01); *C09J 11/08* (2013.01); *D21H 19/12* (2013.01); *D21H 19/60* (2013.01); *D21H 19/826* (2013.01); *C09J 2301/408* (2020.08); *C09J 2400/283* (2013.01); *C09J 2431/003* (2013.01); *C09J 2433/00* (2013.01); *C09J 2475/00* (2013.01); *C09J 2491/003* (2013.01)

(56) References Cited

FOREIGN PATENT DOCUMENTS

| | | |
|---|---|---|
| CN | 110629584 A | 12/2019 |
| CN | 110698913 A | 1/2020 |
| CN | 110747691 A | 2/2020 |
| CN | 112198094 A | 1/2021 |

OTHER PUBLICATIONS

International Search Report dated Jul. 26, 2021; International Application No. PCT/CN2020/141588; International Filing Date Dec. 30, 2020; 2 pages; China National Intellectual Property Administration (ISA/CN), Beijing, China.

* cited by examiner

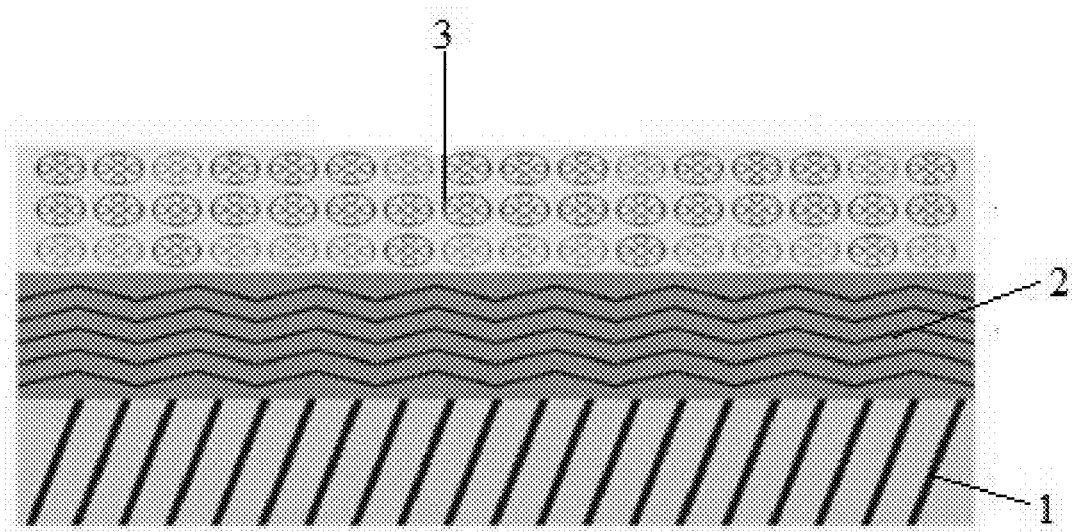

NON-STICKING TIPPING PAPER, PREPARATION METHOD AND APPLICATION METHOD OF THE SAME

CROSS REFERENCE TO RELATED APPLICATIONS

This application is a national phase application of International Pat. Appl. No. PCT/CN2020/141588, filed on Dec. 30, 2020, which claims the benefit of Chinese Pat. Appl. No. 202011247849.0, filed on Nov. 10, 2020, both of which are incorporated herein by reference as if fully set forth herein.

FIELD OF THE INVENTION

The present invention belongs to the technical field of tobacco processing, in particular to a non-sticking tipping paper, a preparation method and applications method thereof.

DISCUSSION OF THE BACKGROUND

The cigarette filter is mainly composed of three layers, including acetate fiber, forming paper and tipping paper. The tipping paper (also known as Shuisong paper in Chinese pronunciation), is used to wrap around the filter tip and bond the filter tip to the end of the tobacco rod. The tipping paper is a decorative paper obtained by printing, coating and other processing on the base paper. The tipping paper is in direct contact with the smoker's lips, and the tipping paper is generally only printed with ink. When consumers smoke cigarettes in dry weather, there may be a small amount of saliva that will wet the tipping paper during the smoking process. After drying slowly, the residual saliva protein on the lips will have a bonding effect on the tipping paper, causing the ink on the filter tipping paper to stick to the skin of the lips, or even the filter tipping paper directly sticking to the lips, which seriously affects the cigarette consuming experience. In order to solve the problem of tipping paper sticking to the lip, patent CN110747691A coats a layer of water-based non-sticking varnish layer on the outside of the coloring layer of the tipping paper. Although that patent solves the problem of the tipping paper sticks to the lips, the water-based non-sticking varnish layer has a greasy feeling, which decreases the consuming experience.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

In order to solve the above problem(s) of the tipping paper for cigarettes sticking to the lips, the present invention coats a water-based glue on the outer layer of the tipping paper.

The purpose of the present invention is to solve the deficiencies of the prior art, and provide a non-sticking tipping paper and a preparation method and application method of the same. The non-sticking tipping paper of the present invention reduces the adhesion between the lip and the surface of the tipping paper, even after becoming wet with saliva, and effectively prevents the ink from sticking to the skin of the lips, thereby avoiding discomfort and possible damage to the lips caused by the cigarette sticking to the lips.

To achieve the above object(s), the technical scheme adopted in the present invention is as follows.

A first aspect of the present invention concerns a non-sticking tipping paper, which includes a base paper, a color layer and a surface coating; the color layer is printed as a color ink on the surface of the base paper; the surface coating is on the color layer and comprises a water-based glue; the water-based glue includes the following components by weight: 30-65 parts of a modified water-based resin solution, 10-20 parts of water, 8-15 parts of ethanol, and 5-12 parts of a water-based additive; the water-based additive comprises a mixture of a wax emulsion and magnesium silicate in a weight ratio of 1:5.

In an embodiment, the modified water-based resin comprises: 10-20 parts of polymethyl methacrylate resin or polyurethane resin liquid, and 20-45 parts of copolymer emulsion of methyl methacrylate and ethyl methacrylate; the methyl methacrylate resin or polyurethane resin liquid has a solid content of 25-30 wt %; the copolymer emulsion of methyl methacrylate and ethyl methacrylate has a solid content of 30-35 wt %.

In another or a further embodiment, the color ink includes the following components by weight: 5-7 parts of a resin, 6-10 parts of a colorant, 0.02-0.05 parts of wax powder, and 20-40 parts of ethanol.

In other and/or further embodiments, the resin is a polyvinyl butyral resin; and the colorant includes black, white and colorful colorants.

In some embodiments, the color layer has a dry printing weight of 2.5-3.0 g/m$^2$, and the surface coating has a dry printing weight of 0.8-1.0 g/m$^2$.

In another and/or a further embodiment, the base paper has a grammage of 32-40 g/m$^2$.

A second aspect of the present invention concerns a method of preparing the non-sticking tipping paper, which includes the following steps: (1) preparing a color ink and printing it on the base paper to form a color layer; and (2) preparing a water-based glue and applying it on or to the color layer.

In one or more embodiments, preparing the color ink and printing it on the base paper to form the color layer comprise adding a polyvinyl butyral resin to ethanol, stirring and dissolving the polyvinyl butyral resin, adding a colorant and wax powder (e.g., in sequence to ethanol), and dispersing the colorant and wax powder for 20-40 minutes at 1000-1400 rpm to obtain a mixed dispersion; grinding the mixed dispersion in a sand mill for 1-3 hours, and filtering the ground dispersion to obtain the color ink; and printing the color ink on the base paper using a printer at a tension of 1.5-6 bar, a rubber roller pressure of 2-7 bar, a vehicle speed of 80-210 m/min and a temperature of 60-210° C., such that the color layer has a dry printing amount of 2.5-3.0 g/m$^2$.

In another embodiment, preparing the water-based glue and coating it on the surface of the color layer includes the following steps: stirring part of the water, part of the ethanol, at least part of the water-based additive and the polymethyl methacrylate resin or polyurethane resin liquid to form a uniform mixture, then dispersing the uniform mixture at high speed until the resin is uniformly dispersed, and then cooling to room temperature; grinding the cooled uniform mixture until solid particles therein have a particle size of ≤15 µm; adding a remaining part of the water, a remaining part of the ethanol, a remaining part of the water-based additive, and the copolymer emulsion of methyl methacrylate and ethyl methacrylate (e.g., to the cooled uniform mixture with the solid particles having a particle size of ≤15 μm) and stirring to uniformity and filtering out large particles to obtain the water-based glue; then applying or coating the water-based glue on the color layer such that the surface coating has a dry coating weight of 0.8-1.0 g/m².

A third aspect of the present invention concerns a method of using the non-sticking tipping paper on cigarette filters (e.g., applying the non-sticking tipping paper onto a tobacco filter), comprising placing the tobacco filter at an end of a filterless cigarette; and wrapping the tobacco filter and an adjacent part of the filterless cigarette with the non-sticking tipping paper.

Beneficial effects of the present invention include the following:

The non-sticking tipping paper of the present invention reduces the surface energy of the tipping paper and reduces the adhesion between the smoker's lip liquid and the surface of the cigarette filter by coating the surface of the color layer with a water-based glue surface coating. It effectively avoids the defect that the ink on the cigarette filter sticks to the skin of the lips, and effectively avoids any possible discomfort or damage to the smokers' lips because of the cigarette filter sticking to the lips.

The non-sticking tipping paper of the present invention also solves the greasy feeling of the water-based anti-lip sticking varnish layer of CN110747691A, and improves the use experience of consumers.

The non-sticking tipping paper of the present invention is directly coated on the color layer (e.g., a surface of the color layer), so that the color layer and the surface coating only adhere to the surface of the tipping paper.

The preparation method of the non-sticking tipping paper of the invention is simple, the obtained non-sticking tipping paper is used in cigarette filters, and provides different ideas for reducing the adhesion of cigarette filters.

These and other advantages of the present invention will become readily apparent from the detailed description of various embodiments below.

BRIEF DESCRIPTION OF THE DRAWING

FIG. 1 is a schematic diagram of the non-sticking tipping paper of the present invention.

In the drawing, 1: base paper; 2: color layer; 3: surface coating layer.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and FIGURES can be replaced by other equivalent characteristics or characteristics with similar objectives, purposes and/or functions, unless specified otherwise.

The invention, in its various aspects, will be explained in greater detail below with regard to exemplary embodiments.

EXAMPLES

The present invention will be described in further detail below in conjunction with the accompanying drawings and embodiments, but the accompanying drawings and embodiments are not intended to limit the technical solutions of the present invention, and all changes or equivalent substitutions made based on the teachings of the present invention shall belong to the present invention's protection scope.

Example 1

A non-sticking tipping paper, comprising a single-sided glossy plain base paper 1 with a grammage of 32 g/m², a color layer 2 and a surface coating 3 was made. The color layer 2 is made by printing and drying a color ink providing a dry printing weight of 2.5 g/m². The surface coating layer 3 is obtained by coating and drying a water-based glue providing a dry coating amount of 0.8 g/m².

The color layer 2 had a raw material composition of 6 parts of polyvinyl butyral resin, 5 parts of iron yellow, 0.3 parts of iron red, 3 parts of titanium dioxide, 0.03 parts of wax powder, and 30 parts of ethanol. Preparation method: adding the polyvinyl butyral resin into the ethanol, stirring to dissolve, adding iron yellow, iron red, titanium dioxide and wax powder in turn, and dispersing for 30 minutes at 1200 rpm to obtain a mixed dispersion; adding the mixed dispersion into a sand grinding mill and grinding for 2 hours, then taking out and filtering to obtain the color ink; using a printer, printing the color ink on the surface of the base paper according to the following parameters: tension of 2 bar, rubber roller pressure of 5 bar, vehicle speed of 100 m/min, temperature of 100° C., and a dry printing weight of the color layer of 2.5 g/m².

The water-based glue was composed of the following raw materials: 15 parts of a modified water-based resin liquid, 42 parts of a modified water-based resin emulsion, 18 parts of water, 13 parts of ethanol, and 12 parts of a water-based additive composed of a wax emulsion and magnesium silicate in a 1:5 weight ratio. Preparation method: adding part of the water, part of the ethanol, part of the water-based additive and all of the polymethyl methacrylate resin or polyurethane resin liquid in sequence while stirring, continuing to stir the mixture until all materials are mixed uniformly; dispersing the mixture at high speed until the resin is uniformly dispersed, then cooling to room temperature and grinding the obtained material until solid particles in the mixture had a particle size of ≤15 μm; adding the remaining water, ethanol and water-based additive and all of the copolymer emulsion of methyl methacrylate and ethyl methacrylate to the above-mentioned ground material in sequence while stirring, and continuing to stir the mixture until all materials are mixed uniformly; filtering to remove large particles and obtain the water-based glue; then coating the water-based glue on the color layer, such that the surface coating had a dry coating amount of 0.8 g/m².

Example 2

Example 2 is the same as Example 1, except for the following differences. The base paper 1 has a gram weight of 39.5 g/m², the color layer 2 is obtained by printing and drying the color ink with a dry printing weight of 3.0 g/m², and the surface coating 3 is obtained by coating and drying a water-based glue with a dry coating weight of 1.0 g/m².

Comparison Example 1

Comparison Example 1 is the same as Example 1, except for the following differences. The surface coating 3 is obtained by coating and drying a conventional glue with a dry coating amount of 0.8 g/m². The raw material composition of the conventional glue was: 57 parts of a liquid PVB resin, having the same solid content as Example 1; 13 parts of ethanol; and 2 parts of wax powder. The preparation method was the same as that of Example 1.

Comparison Example 2

Comparison Example 2 is the same as Example 2, except for the following differences. The surface coating 3 is obtained by coating and drying a conventional glue with a dry coating amount of 1.0 g/m². The raw material composition of the conventional glue is: 57 parts of a liquid PVB resin, having the same solid content as Example 2; 13 parts of ethanol; and 2 parts of wax powder. The preparation method was the same as that of Example 2.

Example 3

The tipping papers obtained in Example 1-2 and Comparison Sample 1-2 were named Sample 1, Sample 2, Control Sample 1 and Control Sample 2, respectively. The surface energy of the tipping paper and the contact angle θ of the tipping paper and artificial saliva were tested. Then the tipping papers obtained in Example 1-2 and Comparative Example 1-2 were used in cigarette filters, and manual multi-group coded blind evaluations were performed to compare the lip stickiness. The composition of artificial saliva is shown in Table 1 below, and the test results and evaluation results are shown in Table 2 below. Among them, the manual evaluation adopted use of multiple groups conducting a coded blind evaluation; that is, the evaluation personnel did not know the contact angle of the sample in advance, and the same sample was divided into multiple groups of random codes, so that the evaluation personnel could evaluate the suction and give a grade from five grades of lip stickiness: non-sticky, lightly sticky, moderately sticky, severely sticky and very severely sticky.

TABLE 1

The composition of the artificial saliva

| Reagent | Concentration (g/l) |
|---|---|
| $MgCl_2 \cdot 6H_2O$ | 0.17 |
| $GaCl_2 \cdot 2H_2O$ | 0.15 |
| $K_2HPO_4 \cdot 2H_2O$ | 0.76 |
| $K_2CO_3$ | 0.53 |
| NaCl | 0.33 |
| KCl | 0.75 |
| HCl (mass fraction: 1%) | Add to pH 6.8 ± 0.1 |

TABLE 2

Test Results

| Example No. | Example 1 | Example 2 | Comparison Example 1 | Comparison Example 2 |
|---|---|---|---|---|
| Contact angle (°) | 110.4 | 109.31 | 57.05 | 71.86 |
| Solid surface energy (mN/m) | 35.71 | 40.72 | 70.82 | 62.13 |
| Stickiness | non-sticky | non-sticky | moderately sticky | lightly sticky |

As can be seen from Table 2, the surface energy of the tipping paper can be significantly reduced by using a water-based glue instead of a conventional glue to make the tipping paper, and the contact angle between the artificial saliva and the tipping paper is increased. It effectively avoids the problem of the ink on the cigarette filter sticking to the skin of the lips, and effectively avoids the problem that the cigarette filter sticking to the lips may cause damage to the lips.

According to the experimental results, when the degree of contact angle θ is ≥100°, or the solid surface energy is ≤50 mN/m, the tipping paper is generally not sticky. For the specific test method and scoring standard, please refer to another application of the Applicant entitled "Determination method of lip sticking force of cigarette tipping paper" (U.S. patent application Ser. No. 17/293,924, filed Dec. 30, 2020, the relevant parts of which are incorporated herein by reference). For the non-sticking tipping paper in the embodiments of the present invention, the contact angle θ is above 100°, and the solid surface energy is below 50 mN/m.

The foregoing has shown and described the basic principles, main features and advantages of the present invention. Those skilled in the art should understand that the present invention is not limited by the above-mentioned embodiments. The above-mentioned embodiments and descriptions only illustrate the principle of the present invention. Without departing from the spirit and scope of the present invention, the present invention will also have various changes and modifications fall within the scope of the claimed invention. The claimed scope of the present invention is defined by the appended claims and their equivalents.

What is claimed is:

1. A non-sticking tipping paper, comprising:
   a base paper,
   a color layer, and
   a surface coating, wherein:
   the color layer is printed on the base paper surface as a color ink including the following components by weight: 57 parts of a resin, 6-10 parts of a colorant, 0.02-0.05 part of a wax powder, and 20-40 parts of ethanol;

the surface coating is on the color layer and comprises a water-based glue;

the water-based glue includes the following components by weight: 30-65 parts of a modified water-based resin solution, 10-20 parts of water, 8-15 parts of ethanol, and 5-12 parts of a water-based additive;

the water-based additive comprises a mixture of a wax emulsion and magnesium silicate in a weight ratio of 1:5;

the modified water-based resin comprises: 10-20 parts of polymethyl methacrylate resin or polyurethane resin liquid, and 20-45 parts of an emulsion containing a copolymer of methyl methacrylate and ethyl methacrylate;

the polymethyl methacrylate resin or polyurethane resin liquid has a solid content of 25-30 wt %; and the emulsion containing the copolymer of methyl methacrylate and ethyl methacrylate has a solid content of 30-35 wt %.

2. The non-sticking tipping paper according to claim 1, wherein the resin in the color layer comprises a polyvinyl butyral resin, and the colorant comprises black, white and colored colorants.

3. A method of preparing the non-sticking tipping paper as described in claim 2, comprising:
preparing the color ink,
printing the color ink on the base paper to form the color layer, and
applying the water-based glue to the color layer.

4. The non-sticking tipping paper according to claim 1, wherein the color layer has a dry printing weight of 2.5-3.0 g/m², and the surface coating has a dry coating weight of 0.8-1.0 g/m².

5. A method of preparing the non-sticking tipping paper as described in claim 4, comprising:
preparing the color ink,
printing the color ink on the base paper to form the color layer, and
applying the water-based glue to the color layer.

6. The non-sticking tipping paper according to claim 1, wherein the base paper has a grammage of 32-40 g/m².

7. A method of preparing the non-sticking tipping paper as described in claim 6, comprising:
preparing the color ink,
printing the color ink on the base paper to form the color layer, and
applying the water-based glue to the color layer.

8. A method of preparing the non-sticking tipping paper as described in claim 1, comprising:
preparing the color ink,
printing the color ink on the base paper to form the color layer, and
applying the water-based glue to the color layer.

9. The method according to claim 8, wherein preparing the color ink and printing the color ink on the base paper comprise dissolving a polyvinyl butyral resin in ethanol; dispersing the colorant and the wax powder for 20-40 minutes at 1000-1400 rpm to obtain a dispersion; grinding the dispersion in a sand mill for 1-3 hours; filtering the dispersion to obtain the color ink; printing the color ink on the base paper using a printer at a tension of 1.5-6 bar, a rubber roller pressure of 2-7 bar, a vehicle speed of 80-210 m/min, and a temperature of 60-210° C., such that the color layer has a dry printing amount of 2.5-3.0 g/m².

10. The method according to claim 8, further comprising preparing the water-based glue by stirring part of the water and the ethanol, part of the water-based additive and the polymethyl methacrylate resin or polyurethane resin liquid to form a uniform mixture, then dispersing the uniform mixture at high speed until the resin is uniformly dispersed, and then cooling to room temperature; grinding the cooled uniform mixture until solid particles therein have a particle size of ≤15 μm; adding a remainder of the water, a remainder of the ethanol, a remainder of the water-based additive and the copolymerized emulsion of methyl methacrylate and ethyl methacrylate to the cooled uniform mixture with the solid particles having a particle size of ≤15 and stirring to uniformity and filtering to obtain the water-based glue; and applying the water-based glue on the color layer comprises coating the water-based glue on a surface of the color layer such that the water-based glue on the color layer has a dry coating amount of 0.8-1.0 g/m².

11. A method of applying the non-sticking tipping paper as described in claim 1 onto a tobacco filter, comprising:
placing the tobacco filter at an end of a filterless cigarette; and
wrapping the tobacco filter and an adjacent part of the filterless cigarette with the non-sticking tipping paper.

* * * * *